(12) United States Patent
Parikh et al.

(10) Patent No.: US 7,624,944 B2
(45) Date of Patent: Dec. 1, 2009

(54) TANDEM AIR INLET APPARATUS AND METHOD FOR AN AIRBORNE MOBILE PLATFORM

(75) Inventors: Pradip G Parikh, Renton, WA (US); Warren A Atkey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 11/553,181

(22) Filed: Oct. 26, 2006

(65) Prior Publication Data

US 2008/0099631 A1   May 1, 2008

(51) Int. Cl.
   *B64D 33/02* (2006.01)
(52) U.S. Cl. .................................... 244/53 B; 137/15.1
(58) Field of Classification Search ................ 244/53 B, 244/53 R, 208, 209, 118.5; 137/15.1, 15.2
   See application file for complete search history.

(56) References Cited

U.S. PATENT DOCUMENTS

| | | | | |
|---|---|---|---|---|
| 2,694,357 A | * | 11/1954 | Lee ............................. | 454/76 |
| 2,699,906 A | * | 1/1955 | Lee et al. .................... | 244/53 B |
| 3,667,703 A | * | 6/1972 | Boek ........................ | 244/53 B |
| 4,836,473 A | * | 6/1989 | Aulehla et al. .............. | 244/130 |
| 4,919,364 A | | 4/1990 | John et al. | |
| 5,114,103 A | * | 5/1992 | Coffinberry .................. | 244/209 |
| 6,349,899 B1 | * | 2/2002 | Ralston ..................... | 244/53 B |
| 6,527,224 B2 | * | 3/2003 | Seidel ...................... | 244/53 B |
| 6,651,929 B2 | | 11/2003 | Dionne | |
| 6,729,156 B2 | | 5/2004 | Sauterleute et al. | |
| 6,901,737 B2 | * | 6/2005 | Schnoor .................... | 60/39.83 |
| 7,014,144 B2 | | 3/2006 | Hein et al. | |

* cited by examiner

*Primary Examiner*—Michael R Mansen
*Assistant Examiner*—Michael Kreiner
(74) *Attorney, Agent, or Firm*—Harness, Dickey & Pierce, P.L.C.

(57) ABSTRACT

A tandem inlet apparatus for use with a high speed mobile platform, for example a commercial or military aircraft. The tandem inlet apparatus includes a Pitot inlet for feeding air to a cabin air compressor (CAC) of an air conditioning pack carried on the mobile platform. A flush heat exchanger inlet is disposed forwardly of the Pitot inlet and longitudinally aligned with the Pitot inlet, for supplying cooling air to a heat exchanger of the air conditioning pack. By locating the heat exchanger inlet forwardly and longitudinally in line with the Pitot inlet, the heat exchanger inlet is able to effectively swallow a large portion of the boundary layer, which results in a thinner boundary layer at the inlet face of the Pitot inlet. This enables a smaller throat area Pitot inlet to be used, as well as a shorter diverter height to be employed with the Pitot inlet, while still realizing an improved recovery factor (RF) performance with the Pitot inlet. The reduced height Pitot inlet also enables drag to be reduced.

18 Claims, 13 Drawing Sheets

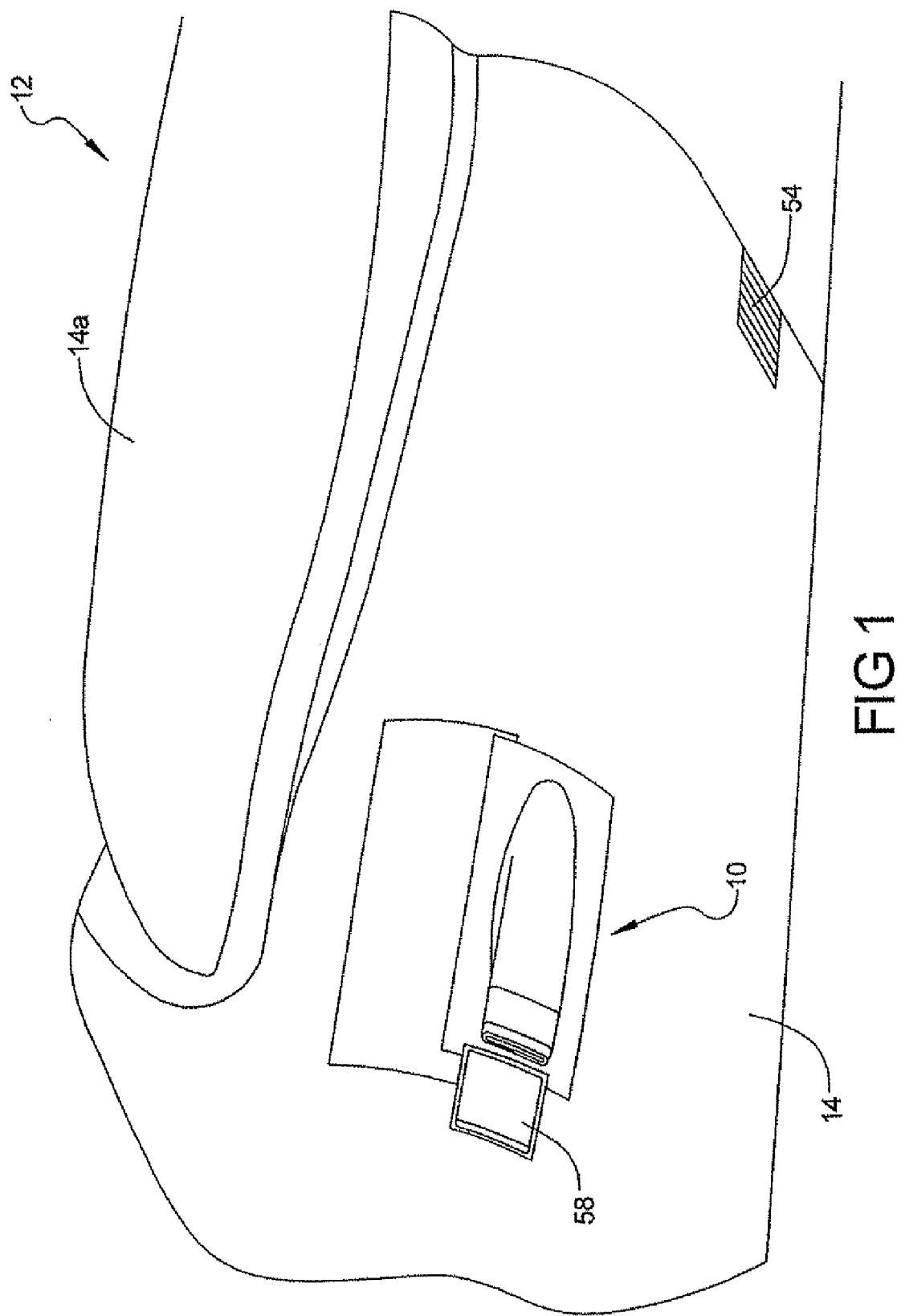

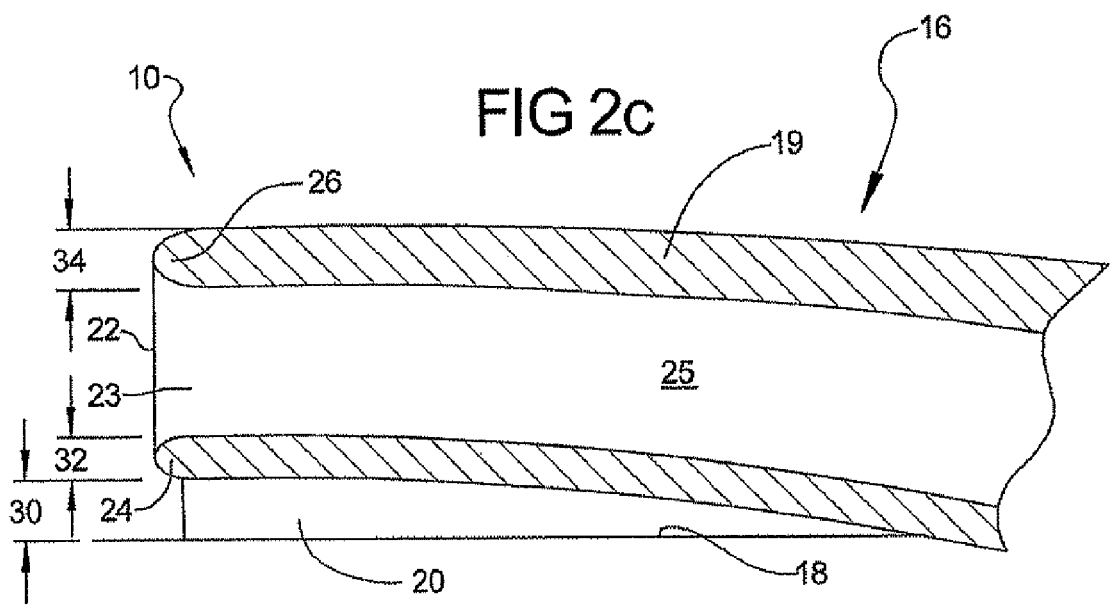
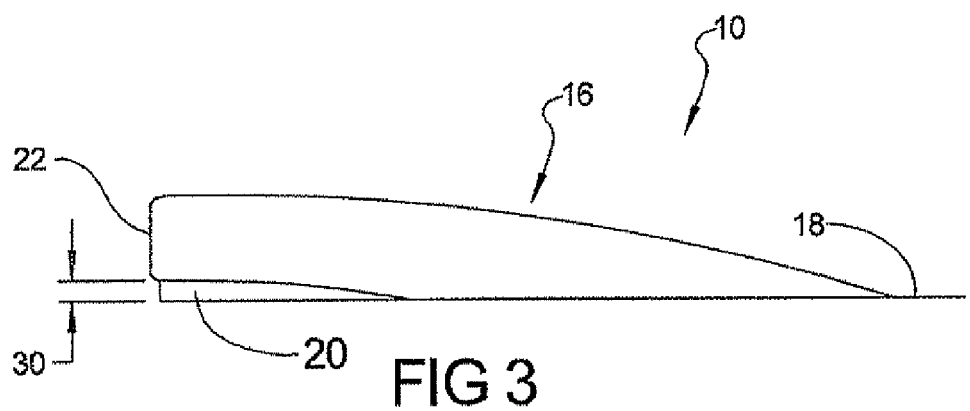

TANDEM AIR INLET APPARATUS AND METHOD FOR AN AIRBORNE MOBILE PLATFORM

CROSS-REFERENCE TO RELATED APPLICATIONS

The present disclosure is related to concurrently filed U.S. patent application Ser. No. 11/553,170, filed Oct. 26, 2006, which is hereby incorporated by reference into the present disclosure.

FIELD

The present disclosure relates to air flow inlets used with high speed mobile platforms, for example commercial and military jet aircraft, and more particularly to a tandem inlet apparatus arranged on the exterior surface of a high speed mobile platform for directing independent airflows to independent subsystems on the mobile platform.

BACKGROUND

Various commercial and military aircraft often make use of a cabin air (CA) inlet for the environmental control system (ECS) that such aircraft employ. Aircraft making use of a CA inlet employ ram air for cabin pressurization rather than bleed air from the engines. With such aircraft, the ram air captured by the CA inlet is often fed to an electric motor driven cabin air compressor (CAC), then conditioned to the desired temperature and pressure in an air conditioning pack, and then supplied to the air distribution system of the cabin.

An important requirement when using ram air to feed a cabin air compressor is achieving a minimum desired recovery factor (RF) at the CAC inlet face. The term "Recovery Factor" may be defined as: Recovery Factor=(Total pressure recovered by the inlet—Free-stream static pressure)/(Free-stream total pressure—Free-stream static pressure). The Boeing Company has also used this terminology in providing design requirements specifications to its suppliers. The same parameter has also been variously called "inlet efficiency", "ram pressure efficiency", "ram-recovery ratio", etc. In all cases the definition of the parameter is the same. The parameter was originally defined by NACA (U.S. National Advisory Committee for Aeronautics, the predecessor of NASA). In practice, it is desirable to achieve the maximum RF possible at the CAC inlet face in order to minimize the electric power required to drive the compressor(s) of the air conditioning pack. This is particularly important at the peak power condition because the generator, motors and other electrical equipment of the ECS need to be sized to meet the peak demand requirements of the aircraft. Ideally, the RF achieved at the CAC inlet face would be 1.0, but in practice it is typically considerably less than 1.0, and often around 0.05-0.7. On the other hand, however, a higher RF for a ram air inlet is generally associated with a higher drag. Therefore, a design challenge is present in providing an inlet for an environmental control system component of the aircraft, and more particularly for a cabin air inlet, that is able to achieve a predetermined minimum RF, while also minimizing the drag of the inlet.

In the presence of a thick fuselage boundary layer, flush mounted ram air inlets (rectangular or NACA planform) that are positioned flush against the exterior surface of the fuselage of the aircraft, and which are of the type used for supplying cooling air to an air conditioning pack heat exchanger, tend to yield a RF in the range of about 0.6 to 0.7. However, due to limitations on available compressor power, it is desirable to achieve a RF closer to 1.0, and at least about 0.8, to make most efficient use of the air inlet. Therefore, present day, flush mounted ram air inlets often fall short of the ideal performance parameters. Furthermore, at low mass flows, flush mounted ram air inlets are also prone to develop an undesirable Helmholtz type duct flow instability, which arises from a coupling between acoustic resonance in the duct and separation of the approaching boundary layer ahead of the inlet. Thus, a concurrent performance consideration, in connection with maximizing the RF performance of the inlet, is to minimize the drag associated with the implementation of the inlet while simultaneously providing an inlet that is able to delay the onset of flow instability to significantly lower mass flows.

Still a further concern is the ability of locating a cabin air inlet relative to the location of one or more additional inlets that are typically used in connection with an environmental control system on an aircraft. For example, on commercial and military aircraft, one or more inlets are used to supply airflow to one or more cabin air compressors, while one or more heat exchanger ram air inlets are also incorporated for supplying cooling air to a heat exchanger of an air conditioning pack on the aircraft. It would be desirable if the heat exchanger inlet could be placed relative to the cabin air inlet in a manner that modifies the boundary layer immediately upstream of the cabin air compressor. This would allow the optimum performance characteristics of the cabin air inlet to be met while still reducing drag associated with the cabin air inlet.

SUMMARY

The present disclosure involves a tandem airflow inlet apparatus for a high speed mobile platform. In one implementation the apparatus is used with a commercial or military jet aircraft.

The tandem airflow inlet apparatus includes a Pitot inlet disposed adjacent an exterior surface of the mobile platform, for channeling airflow to a first subsystem of the mobile platform. A secondary inlet is formed forwardly of the Pitot inlet and longitudinally aligned with the Pitot inlet on the exterior surface of the mobile platform. The secondary inlet channels airflow to a second subsystem of the mobile platform and also operates to modify a boundary layer adjacent said exterior surface, immediately forward of the Pitot inlet, to enhance the recovery factor (RF) performance of the Pitot inlet.

In one specific implementation the first subsystem comprises a cabin air compressor associated with an air conditioning pack carried on the mobile platform. In this implementation the second subsystem comprises a heat exchanger also associated with the air conditioning pack.

In one particular implementation a deployable shield is disposed forwardly of the Pitot inlet for controllably blocking airflow into the Pitot inlet. In another implementation a modulatable door is used to control the airflow into the secondary inlet, In the various embodiments, the heat exchanger inlet operates to modify the boundary layer immediately forwardly of the Pitot inlet by effectively "swallowing" a low energy portion of the boundary layer immediately forward of the Pitot inlet. This allows the Pitot inlet to be designed with a smaller diverter height while still meeting predetermined RF performance requirements.

In one embodiment the air inlet apparatus comprises a Pitot inlet disposed above a boundary layer diverter, where the boundary layer diverter is positioned on an exterior surface of a body portion of the mobile platform. The Pitot inlet receives a boundary layer adjacent the body portion that moves over the body portion during flight of the mobile platform. The boundary layer diverter is able to prevent an inner region (i.e., low energy portion) of the boundary layer closest to the exterior surface of the body portion from entering the Pitot inlet. In one embodiment the boundary layer diverter supports the Pitot inlet above the exterior surface of the body portion.

In another embodiment, the Pitot inlet comprises a throat aspect ratio of between about 5:1 to about 6:1.

In still another embodiment the Pitot inlet includes an inner lip and an outer lip spaced apart from the inner lip, with the inner lip being the lip closer to the exterior surface of the body portion of the mobile platform. The thickness ratio of the outer lip to the inner lip is between about 2:1 to about 4:1. In one specific embodiment, the apparatus forms an air inlet that is especially well suited for use with a cabin air compressor of an environmental control system of a commercial or military aircraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a perspective view of a portion of an exterior surface of an aircraft incorporating an air inlet apparatus in accordance with one embodiment of the present disclosure;

FIG. 2C is an enlarged, cross-sectional view of the Pitot inlet in accordance with section line 2C-2C in FIG. 2A;

FIG. 3 is a side view of the apparatus of FIG. 2A,

DETAILED DESCRIPTION

The following description is merely exemplary in nature and is not intended to limit the present disclosure, application, or uses, Referring to FIG. 1, an inlet apparatus 10 in accordance with one embodiment of the present disclosure is illustrated employed on a fuselage 14 of a mobile platform 12 at a fuselage/wing interface area adjacent to but below a wing 14a. In this example the mobile platform 12 comprises an aircraft, although it will be appreciated that the inlet apparatus 10 could be employed on other forms of high speed mobile platforms such as other airborne platforms, for example on missiles or rockets, or even on high speed land vehicles such as trains, or on marine craft. It is anticipated, however, that the inlet apparatus 10 will find particular utility with commercial and military jet powered aircraft that employ an environmental control system making use of at least one cabin air compressor (CAC).

Figure 2A:
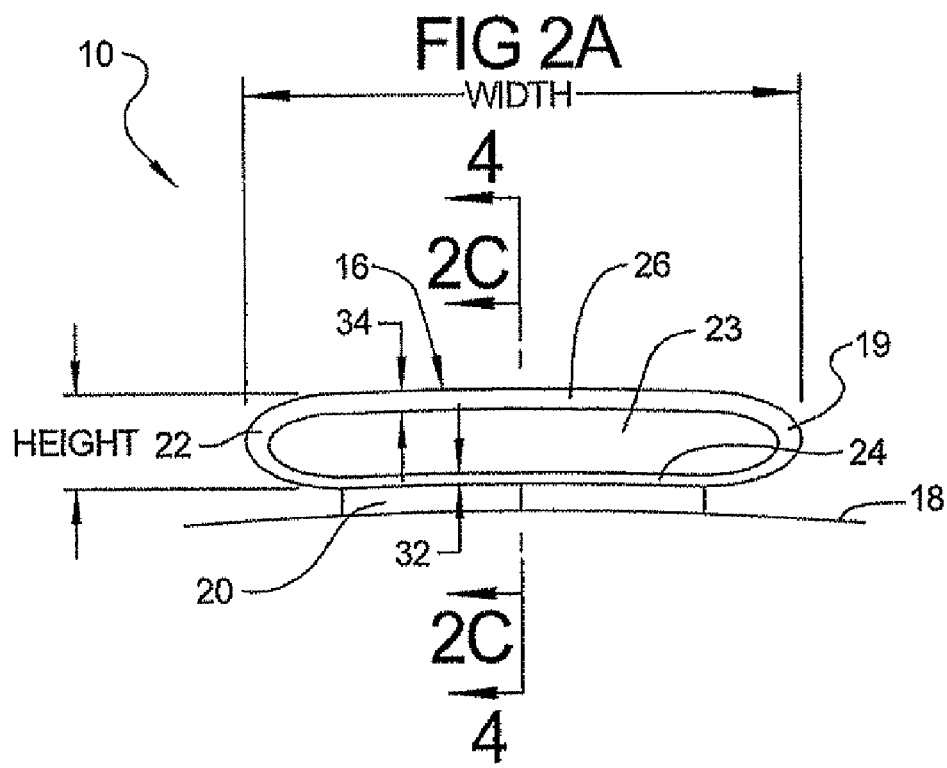
FIG. 2A is a front view of the apparatus of FIG. 1.
Figure 2B:
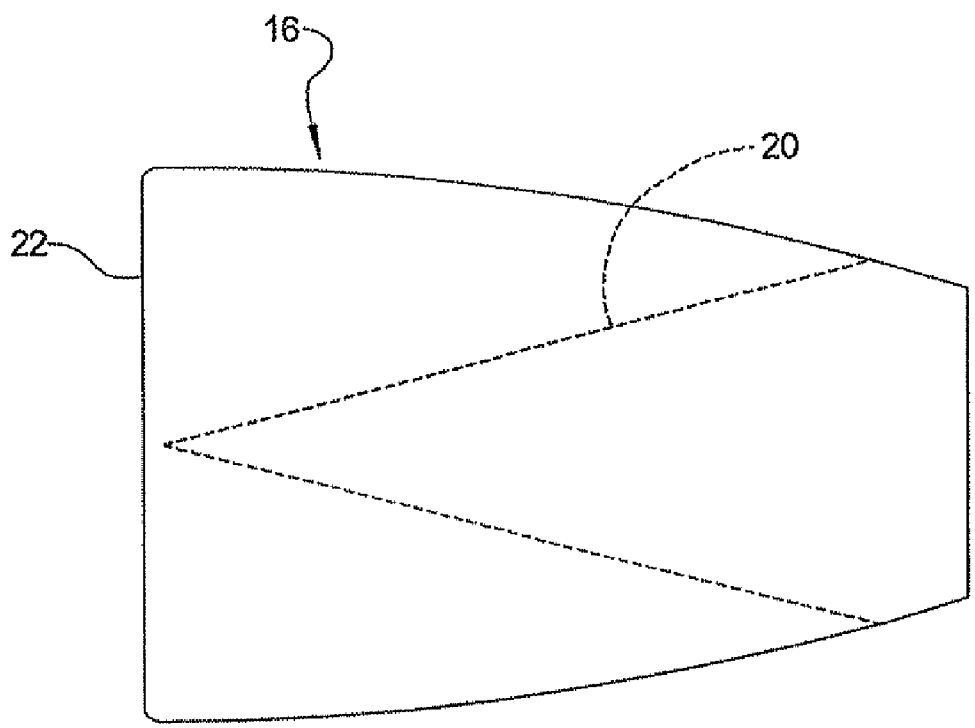
FIG. 2B is a top view of the apparatus.

Referring to FIGS. 2A, 2B, 2C, 3 and 5, the inlet apparatus 10 includes a Pitot inlet 16 having an inlet duct structure 19 that is positioned and supported adjacent an exterior surface 18 of the fuselage 14 by a diverter 20. The inlet duct structure 19 includes inlet face 22 that is formed by an inner lip 24 and an outer lip 26. As shown in FIG. 2C, the inner lip 24 and outer lip 26 help to define an inlet duct 25 having a throat 23. The throat 23 represents the minimum cross sectional area of the inlet duct 25. The inlet duct 25 curves inwardly towards and through the fuselage 14 exterior surface 18 (FIG. 2C). The inlet duct 25 leads to an inlet face of a cabin air compressor (CAC) indicated by numerals 40a and 42a in FIG. 4, that is located within the fuselage 14. The diverter 20 supports the inner lip 24 of the Pitot inlet 16 at a predetermined distance away from the exterior surface 18, as designated by arrows 30 (FIG. 2C). In one embodiment, the distance represented by arrows 30 is between about 1.0 inch-3,0 inch (25.40 mm-76.20 mm), and more preferably about 2.0 inches (50.80 mm).

With further reference to FIG. 2A, the throat aspect ratio (width-to-height) of the Pitot inlet 16 is also a factor in the performance of the inlet, and particularly in obtaining an RF (recovery factor) of close to 1.0 with a minimum drag penalty. A minimum RF of about 0.8 at the inlet face (40a or 42a in FIG. 4) of the cabin air compressor is desirable. However, a higher RF in the range of about 0.88-0.92 is strongly preferred at the throat 23 of the Pitot inlet 16 to account for inlet diffuser losses between the inlet throat 23 and the cabin air compressor (CAC) inlet face at maximum flow rate. This is because the cross sectional shape of the inlet duct 25 needs to transition from a rectangular cross sectional shape to a circular cross sectional shape, which causes the Pitot inlet 16 losses to tend to increase as the throat aspect ratio is increased. Accordingly, a throat aspect ratio of between about 5:1 to about 6:1 is desirable to achieve at least a minimum RF of about 0.8 at the inlet face of the CAC, while minimizing the drag of the Pitot inlet 16.

Referring to FIGS. 2A and 2C, the thickness of the inner lip 24 of the Pitot inlet 16, relative to the outer lip 26, is also important in the performance of the inlet apparatus 10. Preferably, the thickness of the inner inlet lip 24 should be as small as possible in order to prevent deterioration of RF performance at low mass flows (typically mass flow ratio between about 0.2-0.5). Furthermore, when exposed to large amounts of spillage (i.e., airflow being forced outwardly away from the inlet lips 24 and 26), the thinner inner lip 24 does not lead to curvature related flow acceleration to high Mach numbers, which would tend to "clog" the area around the diverter 20.

The thickness of the inner lip 24 is defined by arrows 32 and the thickness of the outer lip 26 is defined by arrows 34. In one embodiment, an outer lip-to-inner lip thickness ratio in the range of about 2:1-4:1 works particularly well to balance drag and RF performance.

Figure 4:
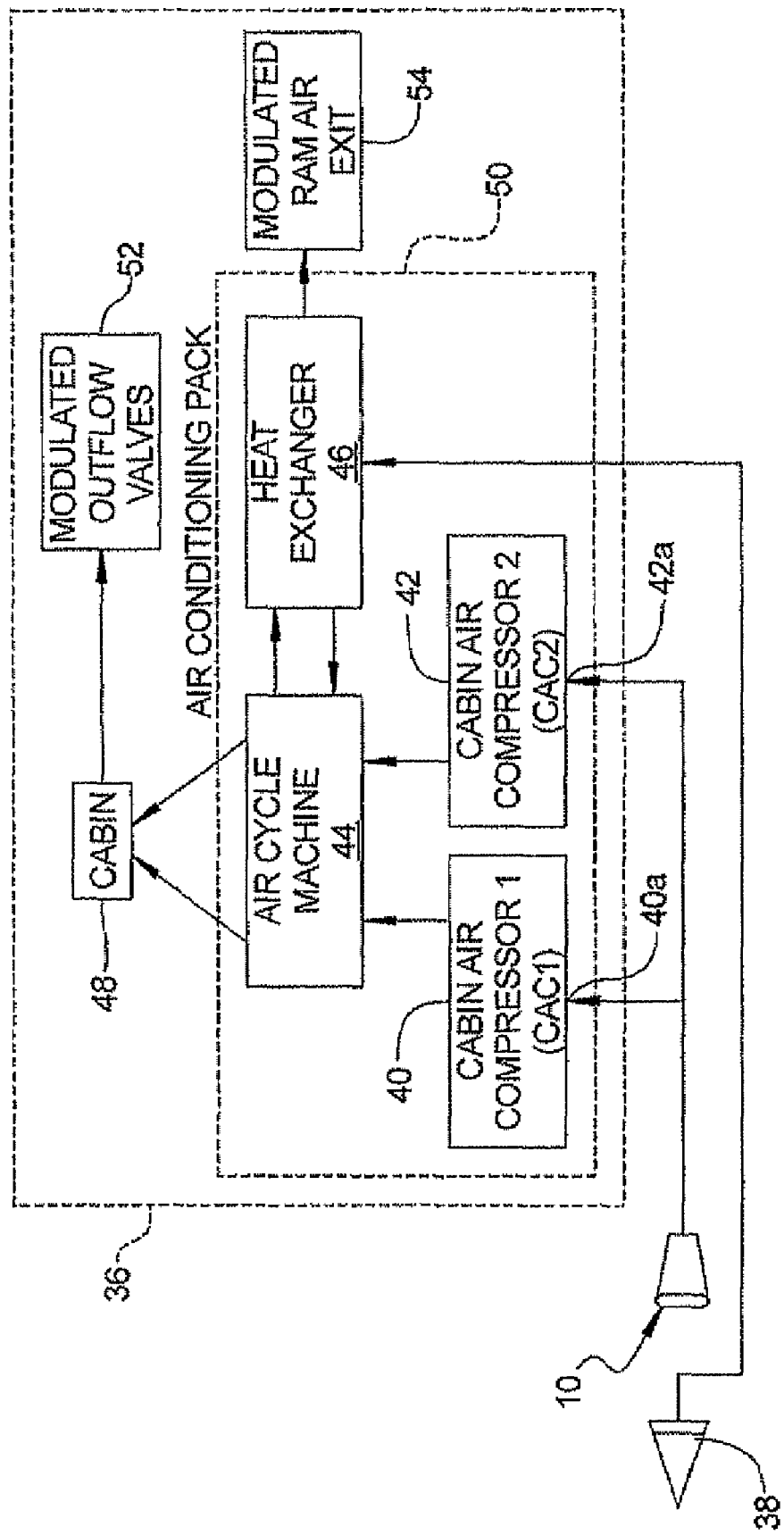
FIG. 4 is a schematic block diagram of a typical environmental control system used with the inlet apparatus, as employed on an aircraft.

With brief reference to FIG. 4, the inlet apparatus 10 is illustrated in a schematic block diagram together with an environmental control system 36 employed on the aircraft 12. The environmental control system (ECS) 36 in this example includes a heat exchanger ram air inlet 38 and a pair of cabin air compressors 40 and 42 that apply compressed air to an ACM (Air Cycle Machine) 44. The cabin air compressors 40 and 42 have inlet faces 40a and 42a, respectively, that are each in communication with the inlet apparatus 10. Hot compressed air from the ACM 44 is passed through a heat exchanger 46 to control the temperature of the air which is supplied by the ACM 44 to a cabin area 48 of the aircraft 12. Components 40, 42, 44 and 46 comprise an air conditioning pack 50. Fresh air from the air conditioning pack 50 is circulated within the cabin 48 and then exhausted through one or more outflow valves 52. Ram air from the heat exchanger inlet 38 is used to cool the hot compressed air in the heat exchanger 46 and subsequently discharged through the modulated ram air exit 54.

Figure 5:
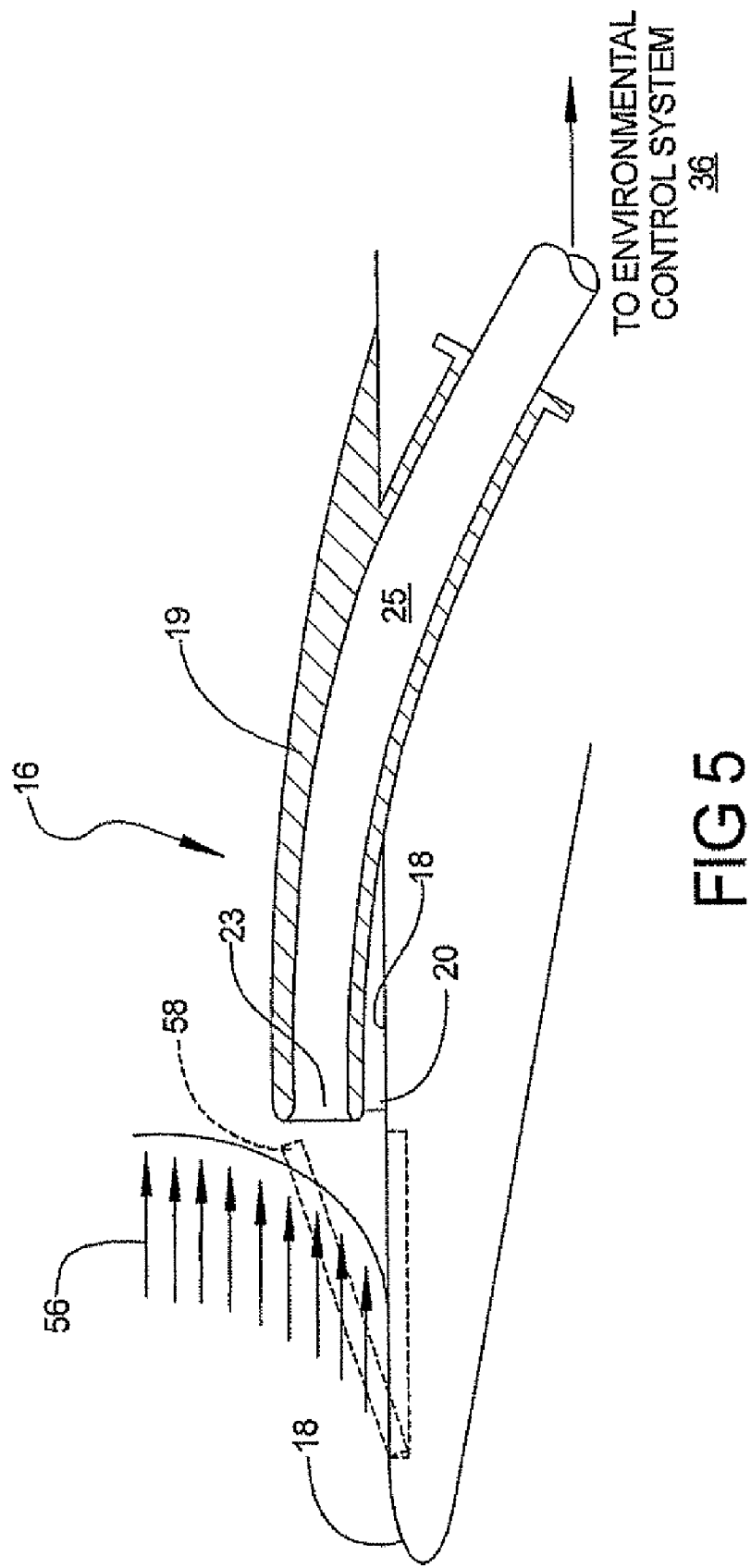
FIG. 5 is a cross sectional side view similar to FIG. 2C showing a boundary layer approaching the apparatus.

Referring now to FIG. 5, a description of operation of the inlet apparatus 10 will be provided. The inlet apparatus 10 is positioned within a boundary layer 56 as the boundary layer 56 moves past the inlet apparatus 10 during flight of the aircraft 12, a low energy portion of the boundary layer 56 is diverted from entering the Pitot inlet 16 by the diverter 20. The low energy portion of the boundary layer 56 is typically that portion which is within about 1.5 inch-2.5 inch (38.10 mm-63.50 mm) from the outer surface 18 of the fuselage 14, and more typically about 2.0 inches (50.80 mm) from the outer surface 18. The Pitot inlet 16 captures the higher momentum outer region of the boundary layer 56. The overall height of the boundary layer 56 in this example is about 5.0 inches (127 mm). Optionally, to prevent the ingestion of foreign object debris (FOD) during takeoff, taxiing and landing operations, a pivotable door 58, shown in phantom, may be disposed forwardly of the inlet face 22 of the Pitot inlet 16. The FOD door 58 can be actuated such that it shields the inlet face 22 during selected times of operation of the aircraft 12.

The inlet apparatus 10 provides the additional benefit of delaying the onset of Helmholtz instability over what could be achieved with a flush mounted inlet. In modes of operation involving a single cabin air compressor, in which the mass flow ratio may drop to approximately 0.2 or slightly lower, a flush mounted inlet would typically require throat area modulation to avoid the onset of Helmholtz instability. Throat area modulation would decrease the RF obtained at the CAC inlet face as well as increase the cost and complexity of the inlet structure.

In the rare event of a dual CAC failure, the mass flow ratio of airflow through the Pitot inlet 16 would drop to nearly zero, and in this instance Helmholtz instability would be likely unavoidable. However, to avoid Helmholtz instability in this scenario, the FOD door 58 could be deployed in flight Such a deployment of the FOD door 58 in flight would shield the Pitot inlet 16 from the impact pressure of the approaching airflow and prevent large amplitude stationary pressure waves (i.e., Helmholtz instability) from developing in the Pitot inlet duct 25.

Accordingly, it can be appreciated that the inlet apparatus 10 operates to provide a significantly increased RF needed to supply cabin air to a cabin air compressor, while minimizing the overall drag of the inlet apparatus 10.

Figure 6:
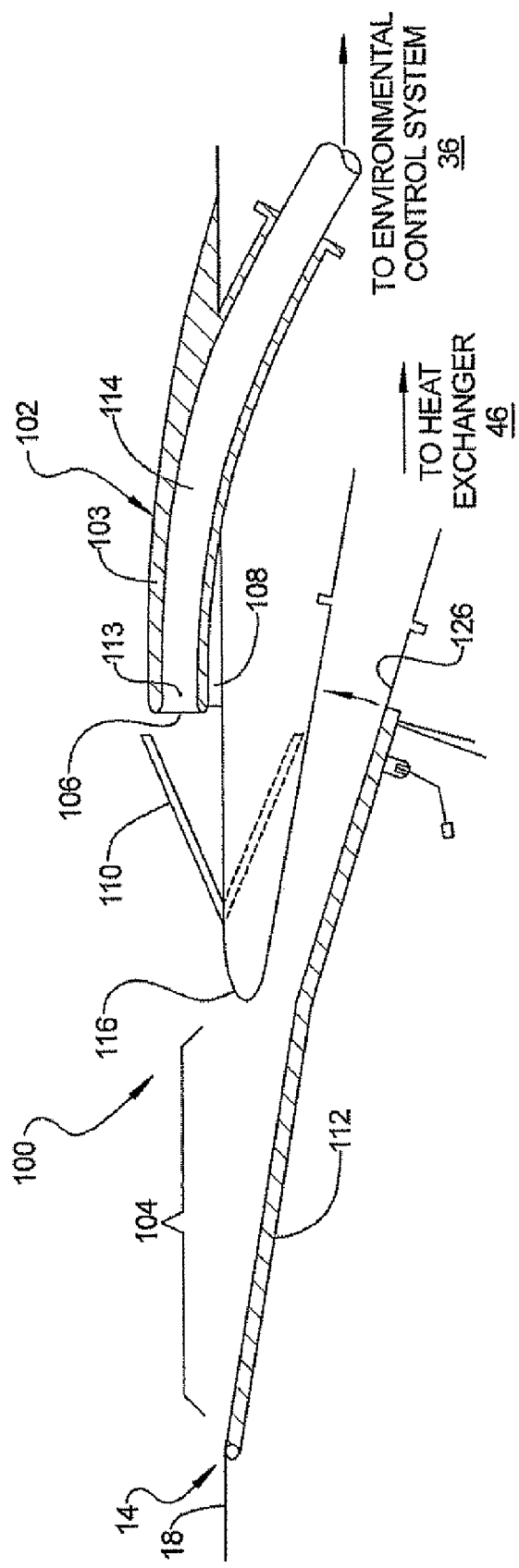
FIG. 6 is a side schematic view of a tandem inlet apparatus in accordance with one embodiment of the present disclosure.

Referring to FIG. 6, a tandem inlet apparatus 100 is illustrated formed on the exterior surface 18 of the fuselage 14 of the aircraft 12. The tandem inlet apparatus 100 makes use of a Pitot inlet 102 and a heat exchanger (Hx) inlet 104 that is positioned forwardly of the Pitot inlet 102, and longitudinally aligned with the Pitot inlet 102 so as to be preferably directly in front of the inlet 102. By "forwardly" it will be understood as being positioned upstream of the Pitot inlet 102, relative to a boundary layer flow over the Pitot inlet 102.

The Pitot inlet 102 includes an inlet structure 103 having a duct 114, a throat 113, a face 106 and a diverter 108. The tandem inlet apparatus 100 may be placed at various locations on the fuselage of the aircraft 12, but in one implementation is placed at the wing/body fairing area indicated in FIG. 1. Optionally, a deployable FOD shield 110 may be employed forwardly of the face 106 of the Pitot inlet 102 in a manner similar to FOD shield 58 described in connection with FIG. 4. In one implementation a modulatable door 112 is used to controllably block the airflow into the heat exchanger inlet 104. Optionally, a modulated 2-door type structure may be used to selectively block the heat exchanger inlet 104.

In this implementation, the deployable FOD shield 110 also operates to prevent debris ingestion during ground operations and to delay the onset of Helmholtz instability within the duct 114 of the Pitot inlet 102 in the same manner as described in connection with FOD shield 58 in FIG. 4.

Figure 7:
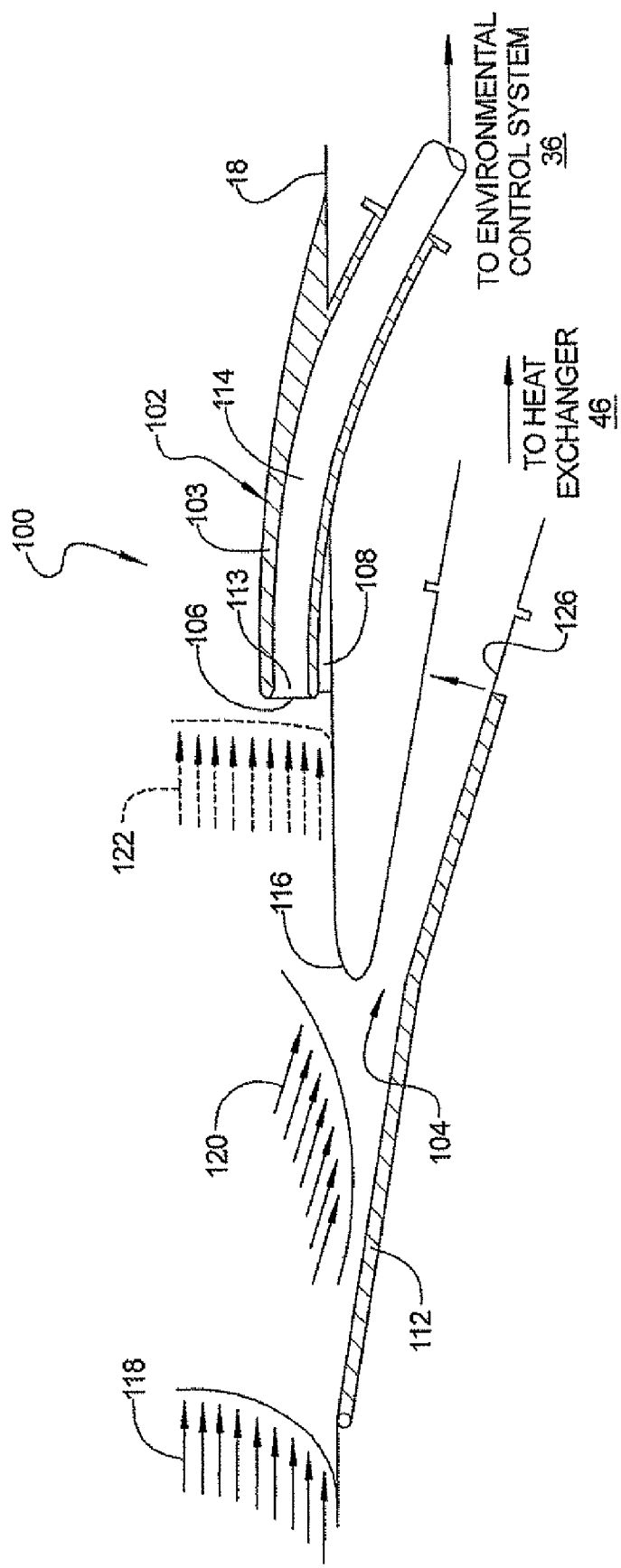
FIG. 7 is a simplified diagram of a portion of a boundary layer being "swallowed" in the heat exchanger inlet, to thus form a thinner boundary layer at the face of the Pitot inlet of the apparatus.

In operation, the tandem inlet apparatus 100 enables the approaching thick fuselage boundary layer 118 in FIG. 7 to be partially or completely "swallowed" by the heat exchanger inlet 104, thus forcing a new, much thinner boundary layer to develop from the lip 116 of the heat exchanger inlet 104. Thus, the Pitot inlet 102, which is placed aft of and in line with the heat exchanger inlet 104, effectively sees a much "thinner" boundary layer at its inlet face 106. This results in a much higher pressure recovery typically close to an RF=1.0 at the inlet face 106 of the Pitot inlet 102. This in turn allows a reduced size inlet throat 113 area to be used for the Pitot inlet 102, as well as a reduced diverter 108 height, to achieve the desired RF performance at the inlet face (40a or 42a) of the cabin air compressor (40 or 42 in FIG. 5).

The placement of the heat exchanger inlet 104 and the Pitot inlet 102 works especially well at a design point condition of highest altitude, "hot" day and maximum cabin airflow, which is used for sizing each of the heat exchanger inlet 104 and the Pitot inlet 102. At altitudes in excess of about 36,000 feet (10,920 meters), a "hot" day is typically understood in the industry to be a temperature warmer than about −70° F. and more typically between about −43° F.--70° F. Under these conditions, the heat exchanger inlet 104 typically operates wide open at the highest mass flow ratio, thereby "swallowing" the entire, or substantially the entire, approaching fuselage boundary layer, as indicated by the boundary layer diagram 120 in FIG. 7. Then the Pitot inlet 102 sees a much thinner boundary layer, as indicated by boundary layer diagram 122 in FIG. 7, at its inlet face 106. The reduced height boundary layer 122 enables an RF of close to 1.0 to be achieved at the inlet throat 113. This allows a reduction in the throat area ($Area_{throat}$) of the inlet throat 113, thus enabling the desired RF performance to be achieved at the cabin air compressor (40 or 42) inlet face (40a or 42a).

Figure 8:
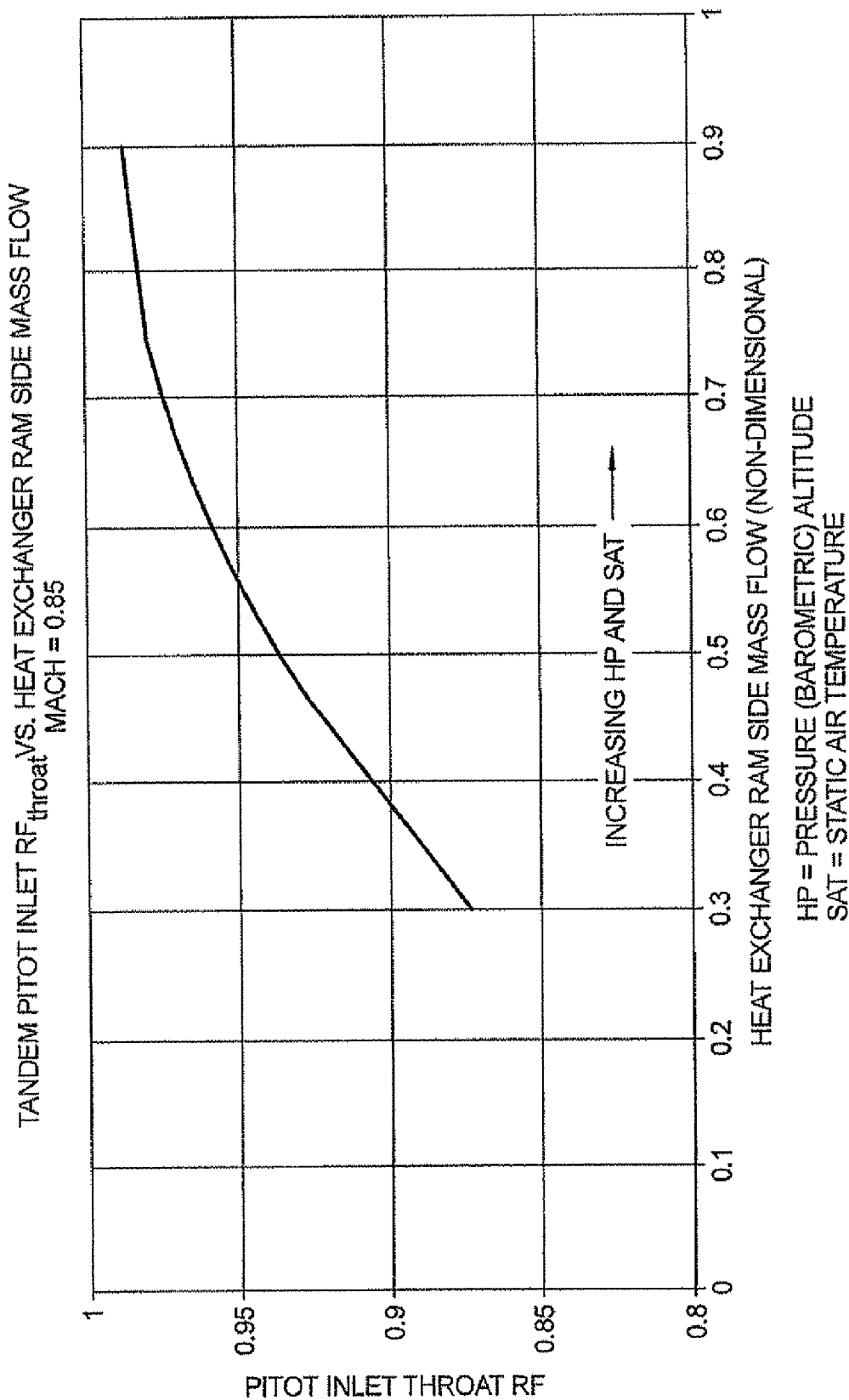
FIGS. 8-11 are graphs obtained in a laboratory environment of boundary layer measurements taken forward and aft of the heat exchanger inlet, that illustrate the modification of the boundary layer induced by the heat exchanger inlet of the present disclosure.

On "cold" days, typically less than about −70° F. at altitudes in excess of about 36,000 feet, and lower altitude conditions (typically 10,000 to 20,000 feet; 3033 m-6066 m) where the heat exchanger cooling airflow demand drops off, the heat exchanger inlet 104 preferably operates at a lower mass flow ratio. The mass flow ratio of the inlet is defined as the actual mass flow through the inlet divided by the mass flow that would pass through the full open throat area of the inlet in the free-stream. At low mass flow ratios, typically in the range of 0.1 to 0.5, the modulated heat exchanger inlet 104 operates in partially open positions. However, the heat exchanger inlet 104 still "swallows in" the lower energy portion of the boundary layer 118 in FIG. 7 that is formed closest to the exterior surface 18 of the fuselage 14. As a result, the boundary layer approaching the Pitot inlet 102 thickens somewhat and the RF drops off at the inlet throat 113. This is illustrated in FIG. 8. In FIG. 8 the throat RF of the tandemly placed cabin air inlet 102 is plotted versus the mass flow ratio of the heat exchanger inlet 104. On a cold day, the heat exchanger inlet 104 would operate at a low mass flow ratio in a partially open position. Therefore, the RF achieved at the Pitot inlet throat 113 would be lower. However, since the free-stream mass flux is higher on a cold day compared to that on a hot day, the mass flow ratio and Mach number at the inlet throat 113 of the Pitot inlet 102 are lower on a cold day. This would reduce the internal losses in the Pitot inlet duct 114. Therefore, the required RF at the cabin air compressor inlet face (40a or 42a in FIG. 5) can still be met with a lower pressure recovery at the Pitot inlet throat 113 on a cold day.

Figure 9:
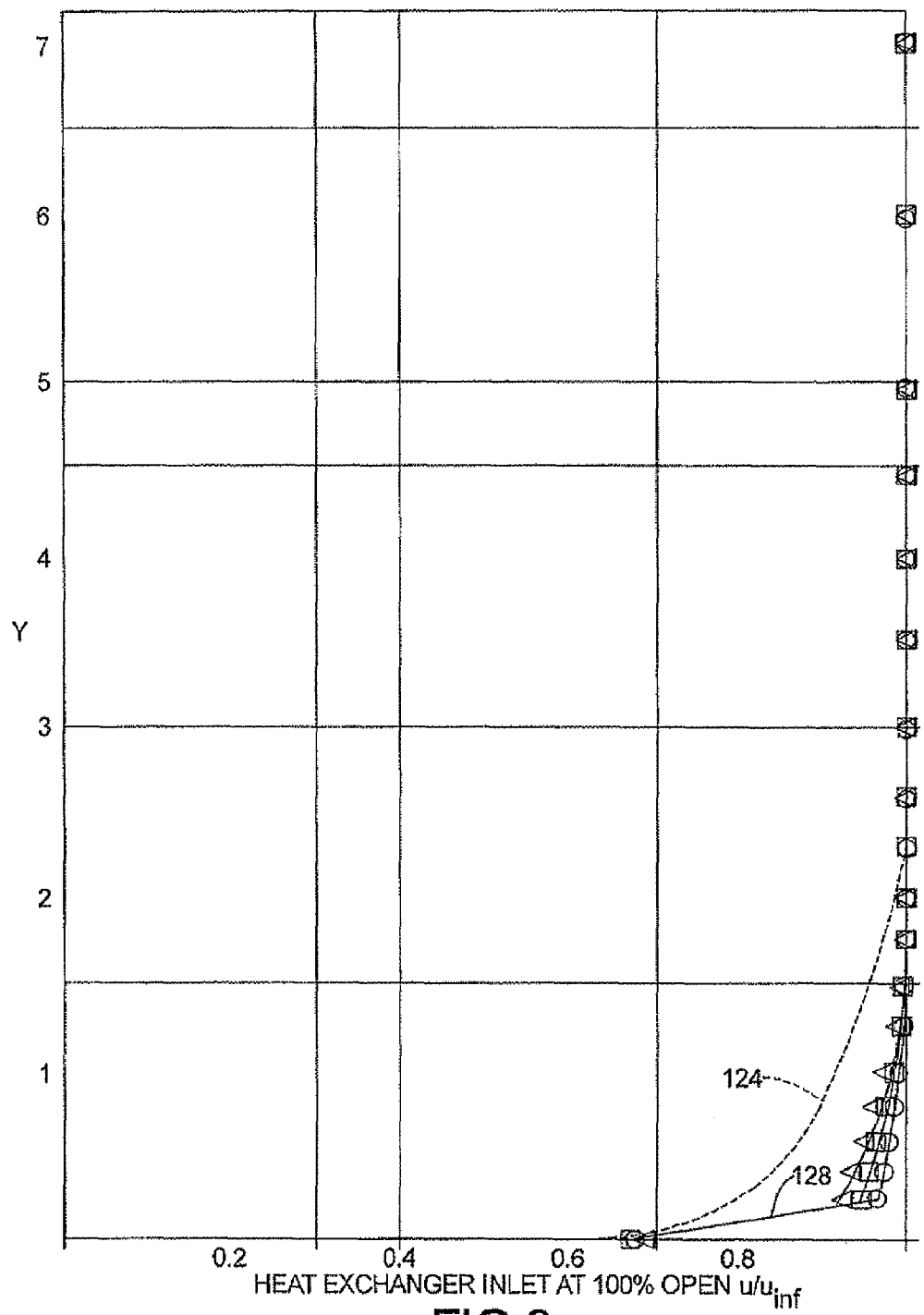
Figure 10:
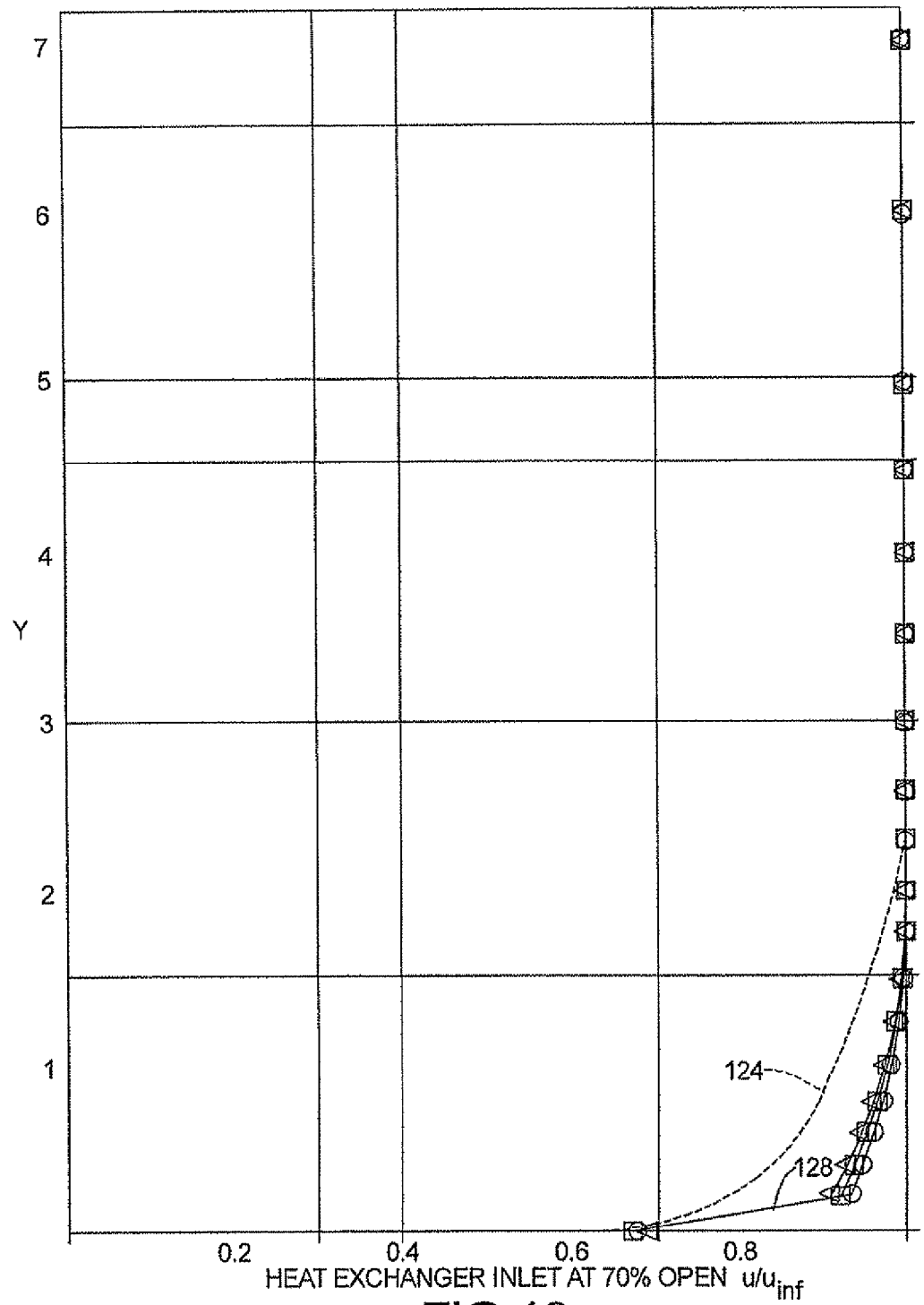
Figure 11:
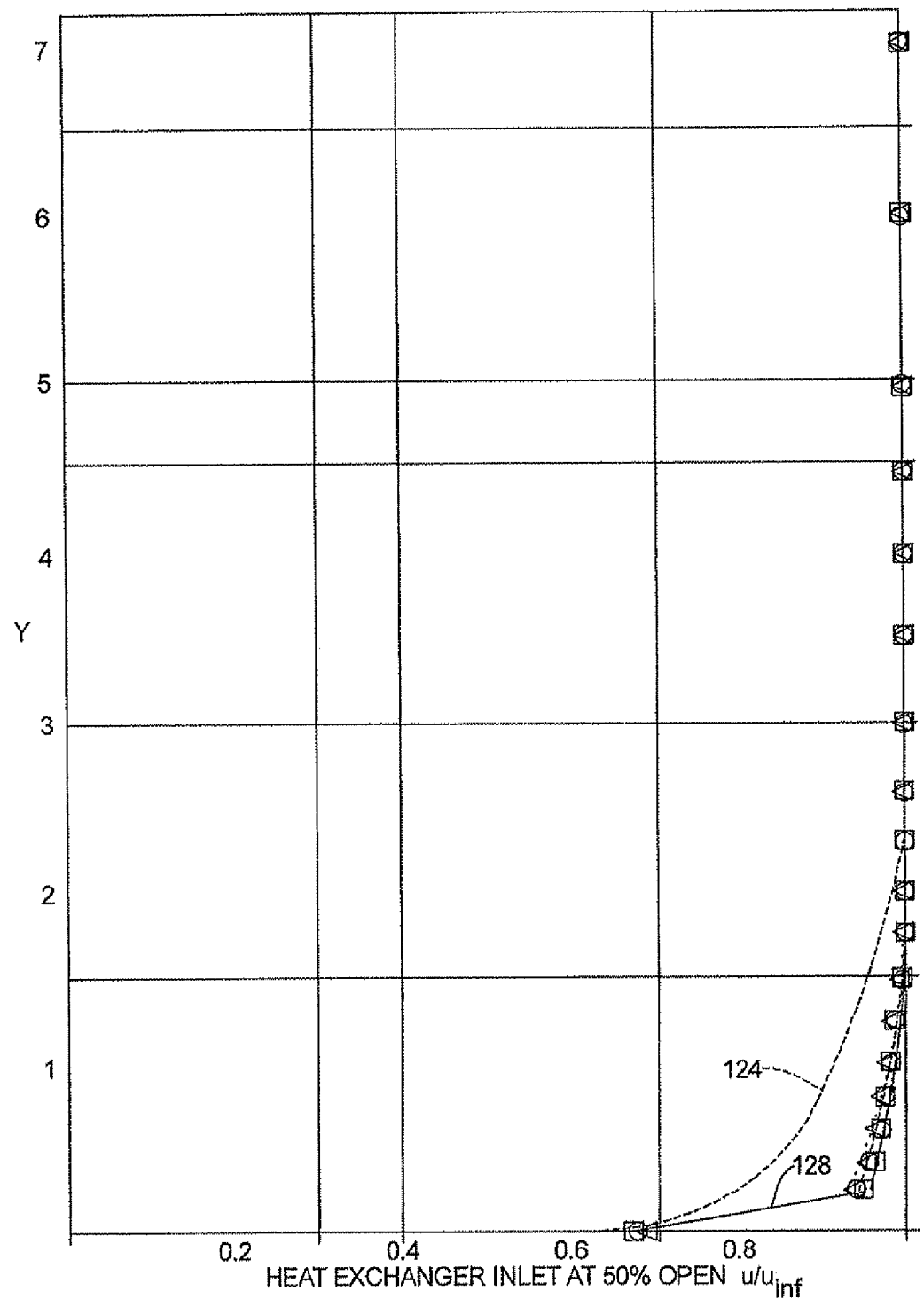

Referring now to FIGS. 9-11, data representing various boundary layer measurements made in a laboratory environment, forward and aft of the modulated heat exchanger inlet 104 are illustrated for a range of heat exchanger inlet openings and mass flows. FIG. 9 illustrates the boundary layer velocity profiles aft of the heat exchanger inlet 104 with the heat exchanger inlet 104 100% open. FIG. 10 illustrates the boundary layer velocity profiles with the heat exchanger inlet 104 approximately 70% open, while FIG. 11 illustrates the boundary layer velocity profiles with the heat exchanger inlet 104 approximately 50% open. In each plot, the boundary layer velocity profiles are shown for several values of mass flow through the heat exchanger inlet 104. The abscissa in these plots is the ratio ($u/u_{inf}$) of local velocity (u) in the boundary layer and the velocity at the edge of the boundary layer ($u_{inf}$). The ordinate is distance (y) in inches from the exterior surface 18 on which the inlets 102 and 104 are installed. On a cold day, the heat exchanger inlet 104 would operate at a low mass flow ratio in a partially open position. Therefore, the RF achieved at the Pitot inlet throat 113 would be lower. The model scale for the test that produced the data represented in FIGS. 9-11 was a scale of one half. The dashed curve 124 in FIGS. 9-11 represents the boundary layer profile just ahead of the heat exchanger inlet ramp 126 in FIGS. 6 and 7, while the data points making up curve 128 in each of FIGS. 9-11 indicate the change in the boundary layer velocity profile aft of the heat exchanger inlet 104 (i.e., which is viewed as being approximately at the inlet face 106 of the Pitot inlet 102). Note that in each of graphs 9-11; the boundary layer velocity profile represented by curve 128, aft of the heat exchanger inlet 116, is much fuller (i.e., the boundary layer is much thinner) compared to the boundary layer velocity profile ahead of the heat exchanger inlet 104, as represented by curves 124. This illustrates that a higher RF is obtained at the inlet face 106 of the Pilot inlet 102 as a result of the heat exchanger inlet 104 effectively "swallowing" a substantial portion of the boundary layer 124.

Figure 12:
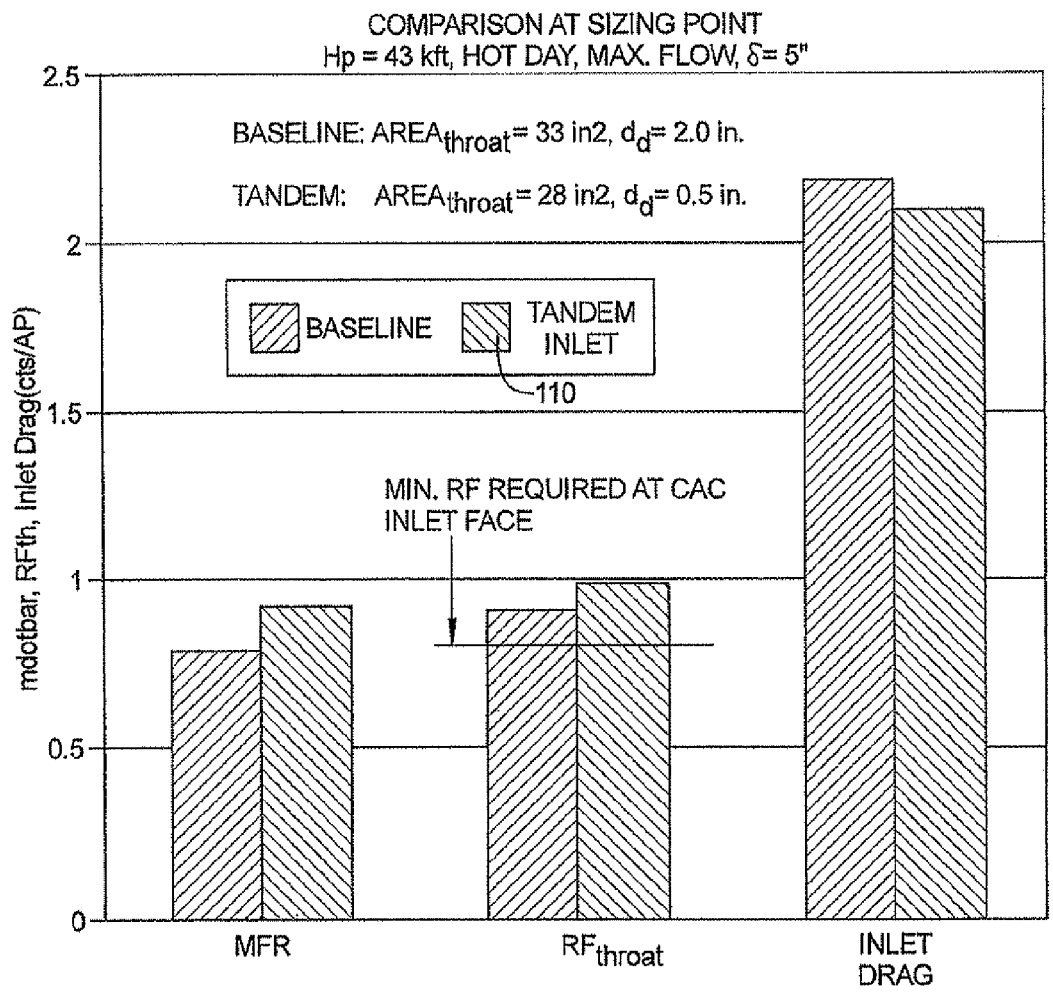
FIG. 12 is a plot illustrating the Pitot inlet sizing benefit resulting from the tandem inlet apparatus via a comparison of a baseline placement of the Pitot inlet without the benefit of the forwardly placed heat exchanger inlet, with the comparison being presented at an altitude of 43,000 feet on a hot day, at maximum flow.
Figure 13:
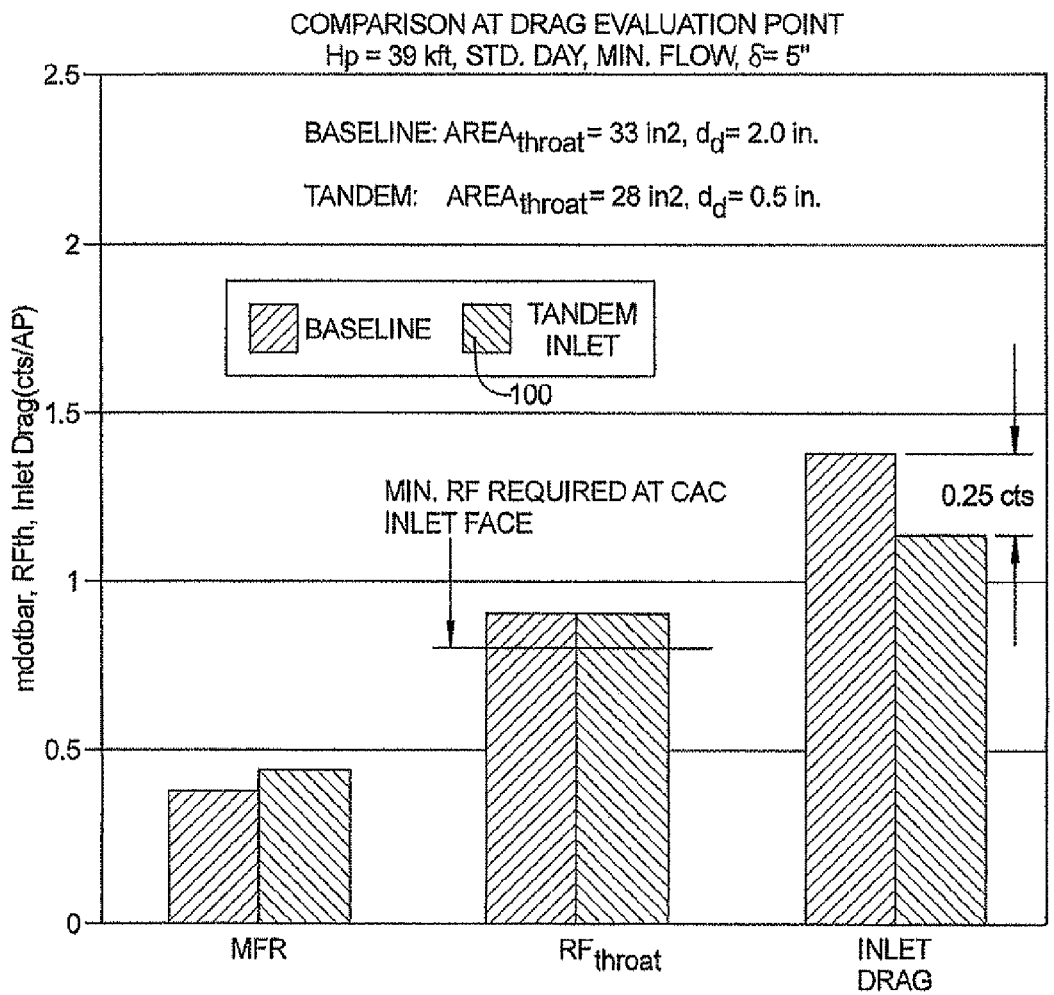
FIG. 13 presents a comparison similar to that presented in FIG. 12, at an altitude of 39,000 feet, on a standard temperature day, at minimum flow.

FIGS. 12 and 13 illustrate plots that show the Pitot inlet 102 sizing benefit resulting from the tandem arrangement of the heat exchanger inlet 104 and the Pitot inlet 102. Referring initially to FIG. 12, for the baseline placement of the Pitot inlet 102 in a five inch thick fuselage boundary layer, without the benefit of the boundary layer being swallowed by the heat exchanger inlet 104, the required inlet throat area is approximately 33 inch$^2$ with a diverter 108 height ($d_d$) of about 2.0 inches. This results in an inlet mass flow ratio of about 0.78, throat pressure recovery (RFth)=0.897, and an inlet drag of about 2.174 cts/AP at the sizing point of 43,000 feet, on a hot day and with maximum flow (cts/AP being the total drag in counts per aircraft produced by both two Pitot type cabin air inlets 102, one on each side of the aircraft. The throat area of the tandemly placed Pitot inlet 102 is approximately 28 inch$^2$ with a diverter 108 height ($d_d$) of about 0.5 inch (12.7 mm), which yields an inlet mass flow ratio of 0.92, throat pressure recovery $RF_{throat}$=0.984, and an inlet drag of 2.085 cts/AP at the same sizing point. The throat mass flow ratio of the tandem Pitot inlet 102 is therefore higher than that of the baseline Pitot inlet, which will result in higher inlet duct 114 pressure losses. However, the throat RF of the tandem Pitot inlet 102 is significantly higher, which is expected to compensate for the higher duct pressure losses and still meet the minimum desired RF requirement (i.e., about 0.8) at the cabin air compressor inlet face.

Referring to FIG. 13, at the drag evaluation point of 39,000 feet (11,830 m), ISA "Standard Day" (i.e., a temperature of about −70° F.) and minimum flow, the tandemly placed Pitot inlet 102 operates at a higher mass flow ratio and throat RF as compared to the baseline Pitot inlet. At this condition the mass flow ratio for the tandem Pitot inlet 102, as well as the baseline Pitot inlet, is quite low. Therefore, the duct 114 pressure losses are small as well, and achieving the required RF performance at the cabin air compressor inlet face is not a problem for either placement. A principal benefit of the tandemly placed inlets 104 and 102 is highlighted in the drag at the performance evaluation point. The Pitot inlet 102 drag is reduced by about 0.25 cts/AP for the tandem placement as compared to the baseline arrangement shown in FIG. 13.

Thus, the tandem inlet apparatus 100 enables the desired level of RF performance to be achieved with a smaller area throat for the Pitot inlet 102, and a shorter diverter 108, because of the ability of the forwardly placed heat exchanger inlet 104 to swallow a good portion of the boundary layer. The benefits realized in the performance of the Pitot inlet are present even when the heat exchanger inlet 104 is partially closed.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A tandem ram air inlet apparatus for a high speed airborne mobile platform, comprising:
   a protruding Pitot inlet disposed adjacent to an exterior surface of said mobile platform, for channeling airflow to a first subsystem of said mobile platform;
   said protruding Pitot inlet including a face having spaced apart upper and lower lip portions and oriented in a plane that is non-parallel to said exterior surface of said mobile platform;
   a diverter for spacing said face a predetermined distance above said exterior surface by at least about 0.25 inch; and
   a secondary inlet formed forwardly of said Pitot inlet and longitudinally aligned with said protruding Pitot inlet on said exterior surface, and mounted generally flush with said exterior surface for channeling ram air to a second subsystem of said mobile platform, and also modifying a boundary layer adjacent to said exterior surface.

2. The apparatus of claim 1, wherein said first subsystem comprises a cabin air compressor associated with an air conditioning pack on said mobile platform.

3. The apparatus of claim 1, wherein said second subsystem comprises a heat exchanger associated with an air conditioning pack on said mobile platform.

4. The apparatus of claim 1, wherein said apparatus provides a recovery factor of at least about 0.8 at a cabin air compressor inlet face in communication with said protruding Pitot inlet.

5. The apparatus of claim 1, wherein said secondary inlet includes at least one modulated door to vary airflow into said flush secondary inlet.

6. The apparatus of claim 1, further comprising a deployable shield disposed forwardly of said protruding Pitot inlet and aft of the flush inlet for the secondary subsystem, relative to a direction of airflow over said protruding Pitot inlet, and longitudinally aligned with said protruding Pitot inlet, for controllably blocking foreign object debris (FOD) ingestion into said protruding Pitot inlet, while still allowing airflow into the protruding Pitot inlet during ground runs prior to takeoff and after landing.

7. The apparatus of claim 1, wherein said protruding Pitot inlet includes a throat aspect ratio of between about 5:1 and about 6:1.

8. The apparatus of claim 1, wherein said protruding Pitot inlet includes a diverter for supporting an inlet opening approximately about 0.25 inch-3.0 inch (6 mm-76.20 mm) outside said exterior surface.

9. An aircraft comprising:
a fuselage;
a protruding Pitot inlet disposed adjacent to an exterior surface of said fuselage, for channeling airflow to a cabin air compressor of an air conditioning pack on said aircraft;
said Pitot inlet including a face that is formed in a plane extending non-parallel to said exterior surface of said fuselage;
a diverter forming a surface generally non-parallel to the exterior surface of the fuselage, the diverter spacing the face approximately 0.25 inch to about 3.0 inch from the exterior surface; and
a flush mounted heat exchanger inlet formed forwardly of said Pitot inlet and longitudinally aligned with said Pitot inlet on said exterior surface, relative to a direction of airflow over an exterior surface of said fuselage when said aircraft is in flight, and mounted generally flush said exterior surface of said fuselage, that channels ram airflow to a heat exchanger of said air conditioning pack, and that also modifies a boundary layer adjacent to said exterior surface.

10. The aircraft of claim 9, wherein said protruding Pitot inlet provides a recovery factor of at least about 0.8 at a cabin air compressor face of a cabin air compressor in communication with said protruding Pitot inlet.

11. The aircraft of claim 9, wherein said flush mounted heat exchanger inlet includes at least one modulated door to vary airflow entering said heat exchanger inlet.

12. The aircraft of claim 9, further comprising a deployable shield disposed forwardly of said protruding Pitot inlet and aft of the flush heat exchanger inlet relative to a direction of airflow over said protruding Pitot inlet, and longitudinally aligned with said protruding Pitot inlet, for controllably blocking airflow into said protruding Pitot inlet.

13. The aircraft of claim 9, wherein said protruding Pitot inlet includes a diverter for supporting an inlet opening of said protruding Pitot inlet outside said exterior surface of said fuselage.

14. The aircraft of claim 9, wherein said protruding Pitot inlet includes a throat aspect ratio of between about 5:1 and about 6:1.

15. A method for directing airflow into inlets of first and second subsystems on an aircraft, comprising:
using a protruding Pitot inlet supported on a fuselage of said aircraft to direct a first airflow stream into said first subsystem;
using a diverter to space a face of the protruding Pitot inlet at least about 0.25 inch from an exterior surface of the fuselage;
positioning an additional airflow inlet, generally flush with said fuselage, in said fuselage forwardly of said face of said protruding Pitot inlet and longitudinally aligned with said protruding Pitot inlet, relative to a free stream airflow over said fuselage when said aircraft is in flight, that directs a second airflow stream into said second subsystem and that modifies a boundary layer forwardly of said face of said protruding Pitot inlet.

16. The method of claim 15, further comprising using a deployable shield positioned forwardly of said face of said protruding Pitot inlet to controllably block foreign object debris (FOD) into said protruding Pitot inlet during ground runs prior to takeoff and after landing.

17. The method of claim 15, further comprising using a modulatable door with said additional airflow inlet to control airflow admitted into said additional airflow inlet.

18. The method of claim 15, wherein using said protruding Pitot inlet and said additional airflow inlet to direct first and second airflow streams into said first and second subsystems comprises:
using said protruding Pitot inlet to direct said first airflow stream into a cabin air compressor; and
using said additional airflow inlet to direct said second airflow stream into a heat exchanger.

\* \* \* \* \*